United States Patent [19]

Horikawa

[11] Patent Number: 5,099,119
[45] Date of Patent: Mar. 24, 1992

[54] RADIATION IMAGE RECORDING AND READ-OUT APPARATUS

[75] Inventor: Kazuo Horikawa, Kanagawa, Japan

[73] Assignee: Fuji Photo Film Co., Ltd., Kanagawa, Japan

[21] Appl. No.: 627,902

[22] Filed: Dec. 14, 1990

[30] Foreign Application Priority Data

Mar. 19, 1988 [JP] Japan .................................. 63-66743

[51] Int. Cl.$^5$ ........................................... G01N 23/04
[52] U.S. Cl. .................................. 250/327.2; 198/810
[58] Field of Search .................. 250/484.1, 327.2, 571; 198/810

[56] References Cited

U.S. PATENT DOCUMENTS

| | | | |
|---|---|---|---|
| 3,513,966 | 5/1970 | Eckels | 198/810 |
| 3,913,729 | 10/1975 | Andrews | 198/810 |
| 4,291,825 | 9/1981 | Glanz | 250/571 |
| 4,527,686 | 9/1985 | Satoh | 198/307 |
| 4,543,479 | 9/1985 | Kato | 250/327.2 K |
| 4,847,499 | 7/1989 | Horikawa | 250/327.2 K |
| 4,864,134 | 9/1989 | Hosoi et al. | 250/327.2 |

FOREIGN PATENT DOCUMENTS

| | | |
|---|---|---|
| 0038207 | 10/1981 | European Pat. Off. . |
| 0077678 | 4/1983 | European Pat. Off. . |
| 5611395 | 2/1981 | Japan . |
| 199708 | 12/1982 | Japan .................................. 198/810 |

Primary Examiner—Carolyn E. Fields
Attorney, Agent, or Firm—Sughrue, Mion, Zinn, Macpeak & Seas

[57] ABSTRACT

An image recording and read-out apparatus comprises an endless recording belt having a stimulable phosphor layer, a group of conveyor rollers for supporting and circulating the recording belt, a snaking detection means for detecting the amount and direction of snaking of the recording belt, and a snaking suppression means for suppressing snaking of the recording belt which, in response to the output of the snaking detection means, swings the axis of rotation of a prescribed one of the group of conveyor rollers in a direction which produces substantially no change in the length of the conveyance path of the recording belt.

4 Claims, 4 Drawing Sheets

RADIATION IMAGE RECORDING AND READ-OUT APPARATUS

This is a continuation of U.S. application No. 07/297,358 filed Jan. 13, 1989, now abandoned.

BACKGROUND OF THE INVENTION

1. Field of the Invention

This invention relates to a radiation image recording and read-out apparatus for storing a radiation image on a recording belt coated with a stimulable phosphor layer, exposing the stimulable phosphor layer to stimulating rays which cause it to emit light in proportion to the stored image information and detecting the emitted light to obtain an electric image signal, and more particularly to a radiation image recording and read-out apparatus of such type wherein the stimulable phosphor layer is formed on an endless belt.

2. Description of the Prior Art

When certain kinds of phosphors are exposed to a radiation such as X-rays, α-rays, β-rays, τ-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in the applicant's U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor is first exposed to a radiation passing through an object to have a radiation image stored thereon, and is then two-dimensionally scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

The radiation image recording and reproducing system using a stimulable phosphor sheet is advantageous over conventional radiography using a silver halide photographic material in that the image can be recorded over a very wide range (latitude) of radiation exposure. More specifically, since the amount of light emitted upon stimulation after the radiation energy is stored on the stimulable phosphor varies over a very wide range in proportion to the amount of energy stored thereon, it is possible to obtain an image having desirable density regardless of the amount of exposure of the stimulable phosphor to the radiation, by reading out the emitted light with an appropriate read-out gain and converting it to an electric image signal to reproduce a visible image on a recording medium or a display device such as a CRT.

In this radiation image recording and reproducing system, the stimulable phosphor sheet is used only for temporarily storing the radiation image in order to reproduce the final visible image therefrom on a final recording medium. For economical reasons, therefore, it is desirable that the stimulable phosphor sheets be used repeatedly.

In view of this, the applicant developed a radiation image recording and reproducing system which enables stimulable phosphor sheets to be circulated and reused with high efficiency. As described in, for example, U.S. Pat. No. 4,543,479, this earlier proposed system integrally comprises: a support; a stimulable phosphor sheet consisting of a layer of a stimulable phosphor capable of storing a radiation image fixed on the support; an image recording section for recording a radiation transmission image of an object on the stimulable phosphor sheet by exposing the stimulable phosphor sheet to a radiation passing through the object; an image read-out section consisting of a stimulating ray source for emitting stimulating rays for scanning the stimulable phosphor sheet carrying the radiation image stored thereon in the image recording section, and a photoelectric read-out means for detecting light emitted from the stimulable phosphor sheet scanned with the stimulating rays to obtain an electric image signal; a circulation and conveyance means for repeatedly moving the support and the image read-out relative to each other so as to cause the stimulable phosphor sheet to be repeatedly circulated relative to the image read-out section; and an erasing section for, prior to the next image recording on the stimulable phosphor sheet for which the image read-out has been conducted in the image read-out section, exposing the stimulable phosphor sheet to erasing light to release the radiation energy remaining on said stimulable phosphor sheet; whereby the stimulable phosphor sheet is efficiently circulated and reused.

In this system, it is highly convenient to form the stimulable phosphor sheet as an endless recording belt consisting of an endless belt coated with a stimulable phosphor layer since this allows the recording belt to be supported on rollers or the like and conveyed successively through the image recording section, the image read-out section and the erasing section.

Among radiation image recording and read-out apparatuses utilizing a recording belt formed as an endless support belt coated with a stimulable phosphor layer, that proposed by the applicant in U.S. patent application Ser. No. 143,919 now U.S. Pat. No. 4,847,499 is of particular interest for its compact size and the high degree of precision with which it enables the scanning with stimulating rays to be carried out. In this recording and read-out apparatus the endless support belt is carried on two roller sections each comprising a pair of rollers. The roller sections are separated by a distance approximately equal to the length of a single radiation image and the image recording section is disposed so as to carry out image recording on the recording belt between the two roller sections. This makes it possible to hold one dimension of the apparatus to approximately the length of a single image. Moreover, the scanning of the recording belt with stimulating rays is carried out at the position where the recording belt passes over one of the rollers. This being the position at which the recording belt travels most stably, the scanning with the stimulating rays can thus be carried out with high precision unaffected by undulation etc. of the recording belt.

However, while the aforesaid recording and read-out apparatus using an endless recording belt is advantageous in that it facilitates the circulation of the stimulable phosphorus layer, it has the drawback that the recording belt is apt to travel in a snaking fashion during operation of the apparatus. While snaking of the recording belt of course makes high-precision image read-out impossible, it may also cause the recording belt to ride up on the side plates and incur irreparable damage.

SUMMARY OF THE INVENTION

The object of the present invention is to provide a radiation image recording and read-out apparatus employing an endless recording belt in which snaking of the recording belt is suppressed by a simple mechanism.

For realizing this object, this invention provides an image recording and read-out apparatus comprising:

an endless recording belt having a stimulable phosphor layer, a group of conveyor rollers for supporting and circulating the recording belt, an image recording section for recording a radiation image of an object on the stimulable phosphor layer by exposing the stimulable phosphor layer to a radiation passing through the object, an image read-out section consisting of a stimulating ray source for emitting stimulating rays for scanning the stimulable phosphor layer carrying the radiation image stored thereon, and a photoelectric readout means for detecting light emitted from the stimulable phosphor layer scanned with the stimulating rays to obtain an electric image signal, an erasing section for, prior to the next image recording on the stimulable phosphor layer for which the image read-out has been conducted in the image read-out section, exposing the stimulable phosphor layer to erasing light to release the radiation energy remaining on said stimulable phosphor layer, a snaking detection means for detecting the amount and direction of snaking of the recording belt, and a snaking suppression means for suppressing snaking of the recording belt which, in response to the output of the snaking detection means, swings the axis of rotation of a prescribed one of the group of conveyor rollers in a direction which produces substantially no change in the length of the conveyance path of the recording belt.

The group of conveyor rollers includes two roller sections, each comprising a pair of rollers, which are preferably spaced from each other by a distance equal to between 1 and 1.5 times the length of the largest sized image that can be recorded in the image recording section and the recording belt is circulated about these two roller sections. This arrangement enables optimum reduction of the overall size of the apparatus. (The distance between the two roller sections is defined as the distance between their outer edges.)

In the apparatus according to this invention, since snaking is suppressed by swinging (tilting) the axis of rotation of a roller in response to the output of the snaking detection means, the travel of the recording belt can be constantly maintained in a constant state by a simple adjustment.

DESCRIPTION OF THE PREFERRED EMBODIMENT

The present invention will hereinbelow be described in further detail with reference to the accompanying drawings.

Figure 1:
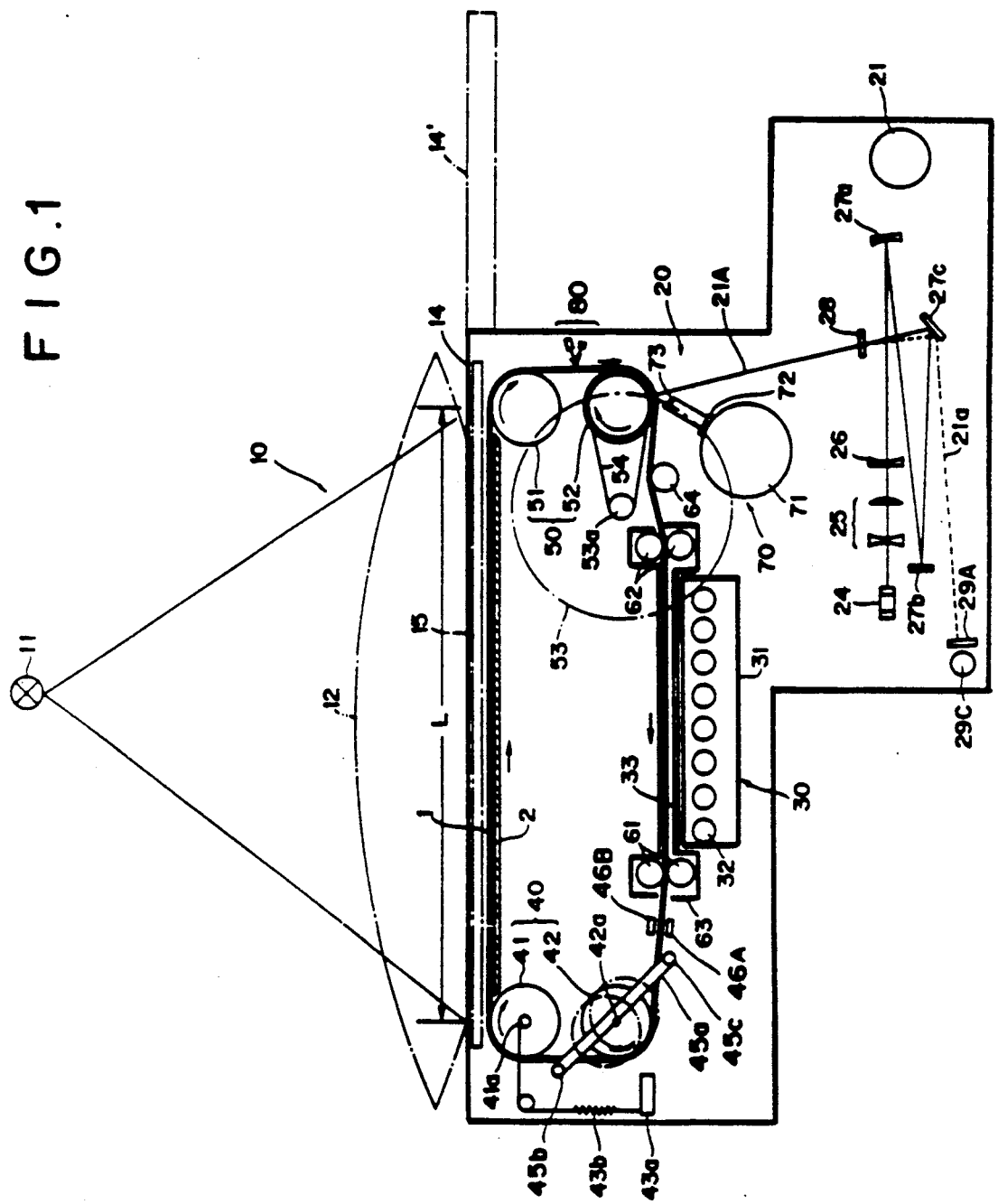
FIG. 1 is a schematic side view of an embodiment of the radiation image recording and read-out apparatus according to the present invention.
Figure 2:
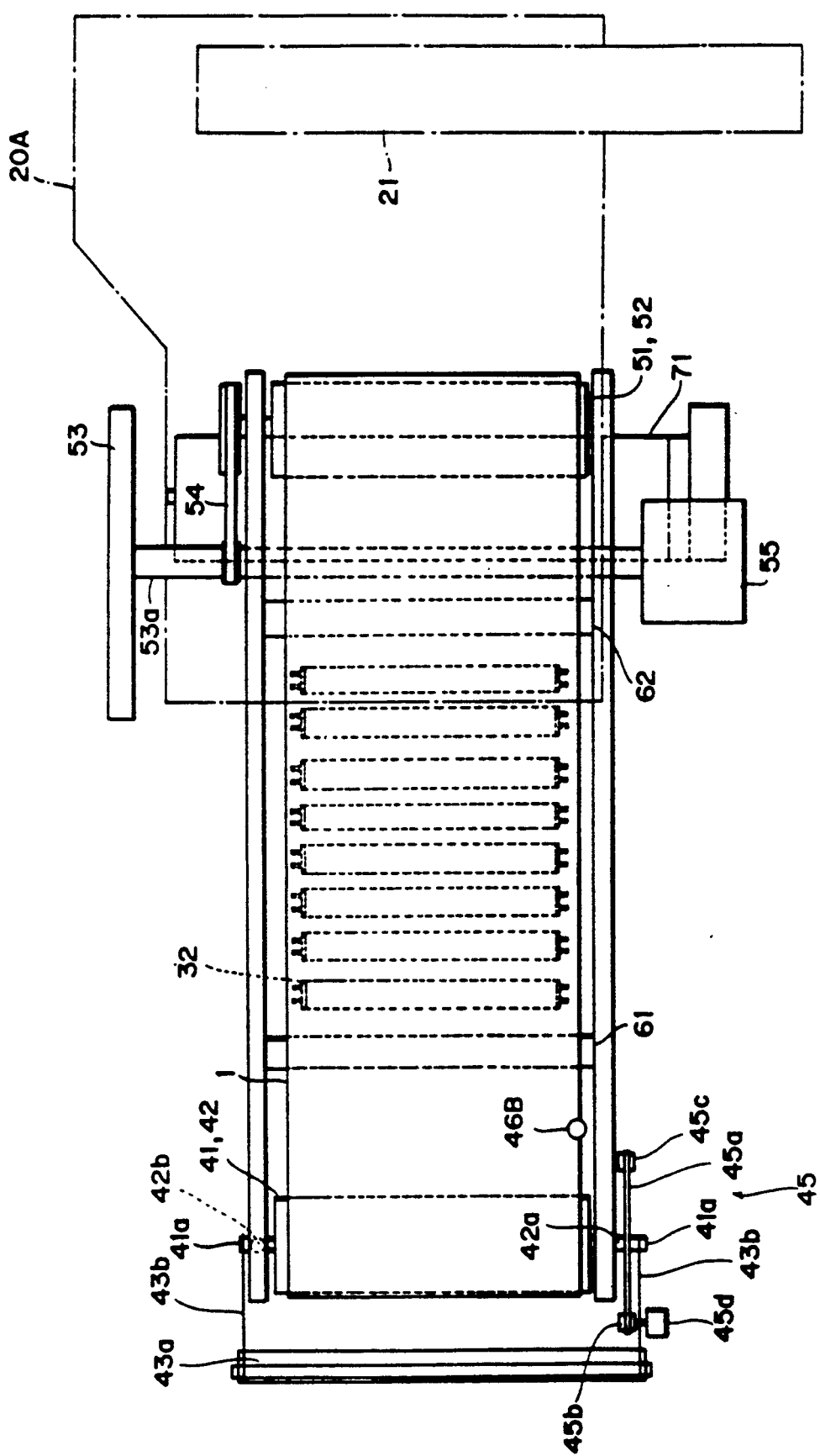
FIG. 2 is a plan view of the main portion of the apparatus of FIG. 1.

Referring to FIGS. 1 and 2, the radiation image recording and read-out apparatus is provided with a recording belt 1 supported on a first roller section 40 consisting of rollers 41, 42 and a second roller section 50 consisting of rollers 51, 52. The first roller section 40 and the second roller section 50 are separated from each other by an axis-to-axis distance L and the recording belt 1 is circulated about the two roller sections 40, 50 in the direction indicated by the arrows in FIG. 1. In this embodiment of the apparatus, the first and second roller sections 40, 50, together with nip rollers 61, 62 and a roller 64 to be explained later, constitute a conveyor roller group for the recording belt.

A radiation source 11 for emitting X-rays or the like is disposed above the recording belt 1 and stands face to face therewith. The upper portion of the apparatus including this radiation source 11 and a recording table 14 for supporting an object 12 of which a radiation image is to be recorded constitute an image recording section 10.

In the image recording section 10, when the radiation source 11 is activated with an object 12 lying on the recording table 14, radiation passing through the object 12 produces a radiation transmission image of the object 12 on the recording belt 1 and this radiation image information is stored in the stimulable phosphor layer of the recording belt. The axis-to-axis distance L between the first and second roller sections 40, 50 is approximately equal to the length of a single image recorded on the recording belt 1 in this way. The radiation transmission image recorded in a single image recording operation is therefore stored over the entire upper portion of the recording belt. It should be noted that the statement that distance L is approximately equal to the length of a "single image" means equal to the length of the largest image that can be recorded with the apparatus. Where the recording of smaller images is conducted, they are recorded on suitable portions of the total upper area of the recording belt.

Depending on the nature of the object being subjected to image recording, it may be advisable to dispose a grid device 15 such as a Bucky's device between the recording table 14 and the recording belt 1. This is because in recording a radiation image of a thick object such the chest of a human being, scattered radiation from the object is apt to degrade the quality of the radiation image. It therefore becomes necessary to dispose between the object and the recording belt a grid device including a grid for absorbing scattered radiation or, alternatively, a so-called Bucky's device consisting of such a grid and a means for reciprocating the same. However, since this invention also contemplates an arrangement enabling simultaneous recording and read-out of image information, a special measure must be taken in the case of providing a Bucky's device because movement of its grid is apt to create random vibration that will reach the read-out section during read-out operation. Namely, if the Bucky's device is driven by a spring, it is necessary to use a specially designed spring so as to control the rate of grid acceleration, while if it is driven by a motor, it is necessary to control the speed of the motor for the same purpose.

During image recording, the recording belt 1 is stopped so that the portion thereof on which image recording is to be carried out stands opposite to the radiation source 11. After image recording has been completed, the recording belt is then conveyed by the rollers 41, 42, 51, 52 in the direction of the arrows so as to bring the portion thereof that carries the recorded image to an image read-out section 20 provided at the lower right of the recording belt 1. The roller 52 is linked by belt or chain to the shaft 53a of a motor 53 and serves as the driving roller for recording belt conveyance. The remaining rollers 41, 42, 51 merely follow the motion of the recording belt as it is driven by the driving roller 52. Moreover, as shown in FIG. 2, the shaft 53a has a rotary encoder 55 mounted thereon. The rotary encoder 55 is for detecting the motor rotation and providing data to be used for various types of control.

The roller 41 of the first roller section 40 is attached at the opposite ends of its shaft 41a to springs 43b which are attached at their opposite ends to a support plate 43a. The roller 41 thus serves as a tension roller which applies a force to the recording belt 1 for keeping it taut. The provision of this tension roller among the group of conveyor rollers for conveying the recording belt prevents sagging and unstable running of the recording belt during conveyance thereof and thus helps to ensure precision conveyance thereof at all times.

One end of the shaft 42a of the roller 42 of the first roller section is fixed on a belt 45a which is supported on a pair of rollers 45b, 45c and driven by a motor 45d connected to the roller 45b. The position of the roller 42 can thus be shifted by the movement of the belt 45a and in the apparatus of the present invention it is this movement of the roller 42 which is used to suppress snaking of the recording belt, as will be explain more fully later.

Figure 3:
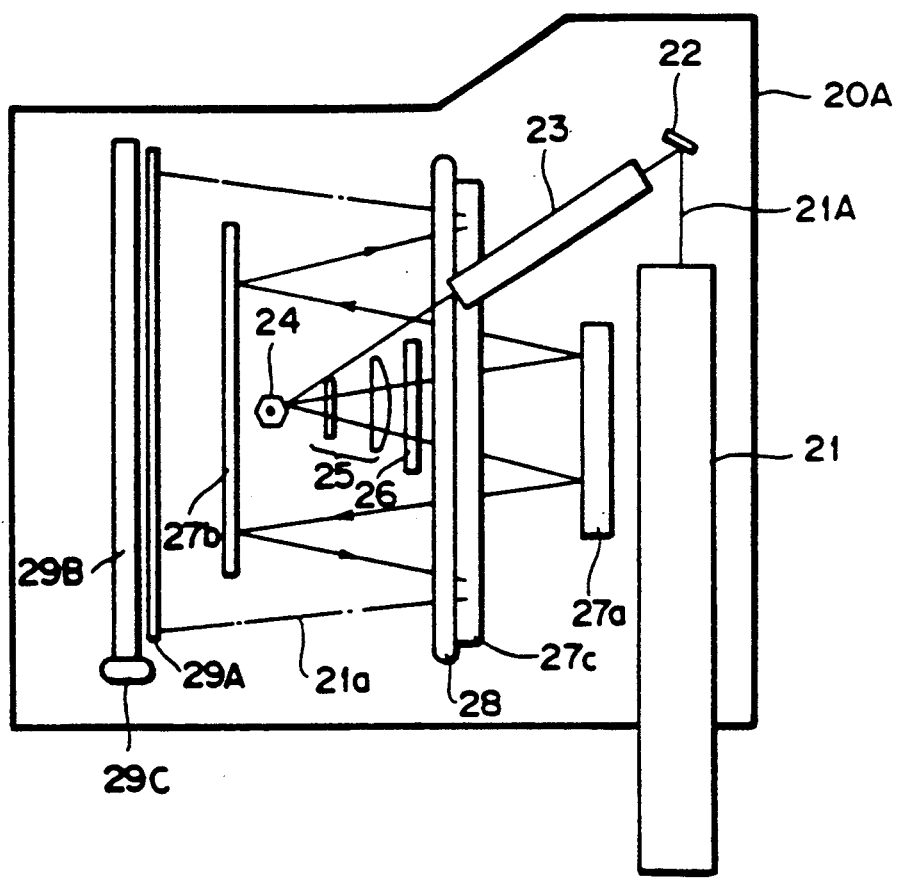
FIG. 3 is a plan view of the optical system of the image read-out section of the apparatus of FIG. 1.

The recording belt 1 is conveyed by the two roller sections 40, 50 of the aforesaid arrangement so as to bring the part thereof carrying the recorded image to the image read-out section 20, where the image information stored on the recording belt 1 is read out. The image read-out section 20 will now be explained with respect FIGS. 1 and 2 and also with respect to FIG. 3 showing a plan view of an optical unit 20A (see FIG. 2) which is the part of the image read-out section including the optical system for scanning the recording belt 1 with stimulating rays.

The image read-out section 20 is provided with a stimulating ray source 21 such as an He-Ne laser which extends perpendicularly to the direction of conveyance of the recording belt 1 and emits a stimulating beam 21A. A rotary polygonal mirror 24 is disposed in the optical path of the stimulating beam 21A to serve as a beam deflector for causing the stimulating beam 21A to scan the recording belt 1 in its transverse direction (perpendicularly to the drawing sheet in FIG. 1). Upon leaving the stimulating ray source 21, the stimulating beam 21A is deflected by a mirror 22 so as to pass through an input beam optical system 23 or the like and then impinge on the rotary polygonal mirror 24. The stimulating beam 21A deflected by the rotary polygonal mirror 24 first passes through a scanning optical system 25 constituted of an fθ lens or the like and then through a cylindrical lens 26. Next, it is deflected by a cylindrical mirror 27a and reflecting mirrors 27b, 27c, whereafter it repeatedly scans the portion of the recording belt 1 currently present on the lower surface of the roller 52 in the main scanning direction. The cylindrical lens 26 and the cylindrical mirror 27a are optical elements which refract the stimulating beam 21A in a plane parallel to that of the drawing sheet of FIG. 1. In the optical system just described, these optical elements, together with the cylindrical lens of the input beam optical system 23, prevent non-uniformity of the scanning pitch on the recording belt even if the rotary polygonal mirror 24 should wobble or the plane of its mirror surfaces should deviate from vertical. Between the reflecting mirror 27c and the scanning position on the recording belt 1 is disposed a beam splitter 28 which transmits most of the light of the stimulating beam 21A impinging thereon and reflects the remainder thereof. The light transmitted through the beam splitter 28 is used as the stimulating beam while the light 21a reflected thereby is directed onto a grid 29A which extends in the scanning direction and consists of alternate light and dark sections. The light passing through the grid 29A is condensed by a condenser rod 29B positioned behind the grid 29A and then detected by a light detector 29C. In this way there is obtained a sync signal indicating the scanning position of the stimulating beam 21A. At the same time that scanning of the stimulating beam 21A is conducted in the main scanning direction, the recording belt 1 is conveyed through the image read-out section 20 at a constant speed (to the left in FIG. 1) for carrying out scanning in the sub-scanning direction. As a result, the portion of the recording belt 1 located at the image recording section 10 and carrying radiation image information is completely scanned by the stimulating beam 21A.

The portion of the recording belt 1 exposed to the stimulating beam emits light in proportion to the image information stored thereon and the emitted light is detected by a photoelectric read-out means 70. As described for example in U.S. patent application Ser. No. 141,259, now U.S. Pat. No. 4,864,134 the photoelectric read-out means 70 used in the present apparatus is longer in the main scanning direction than the main scanning width and comprises an elongate photomultiplier 71 disposed with its light receiving face facing the main scanning line, a filter 72 disposed on the light receiving face of the photomultiplier for cutting light reflected from the surface of the recording belt 1 and selectively allowing only the light emitted by the stimulable phosphor layer of the recording belt 1 to reach the photomultiplier 71, and a light collector plate 73 attached via the filter 72 to the light receiving side of the photomultiplier 71 for enhancing the collection of the light emitted by the recording belt 1. The light emitted from the portion being scanned by the stimulating beam enters the photomultiplier 71 through the light collector plate 73 and the filter 72 and is photoelectrically converted by the photomultiplier 71, whereby there is obtained an electric signal. After being image processed as required, this electric signal is forwarded to a display such as a CRT, to a device for recording a visible image by point-by-point scanning on a photographic film, or to any of various other types of image reproducing apparatuses.

If desired, the aforesaid read-out of the radiation image information can be carried out in accordance with the known method wherein a preliminary read-out operation for determining the general nature of the radiation image information stored on the recording belt is conducted in advance of the read-out operation for obtaining an image signal for producing a visible image for viewing (the final read-out) and thereafter the final readout is conducted in accordance with read-out conditions determined on the basis of the image information obtained in the preliminary read-out.

This preliminary read-out can be conducted by, for example, scanning the recording belt 1 with a stimulating beam of a lower energy than that of the stimulating beam to be used in the final read-out and detecting the light emitted as a result of this scanning by a photoelectric read-out means. Such a method is disclosed in, for example, U.S. Pat. No. 4,527,060.

As the image read-out section of the apparatus according to the present invention, there can if desired be used one capable of conducting both preliminary and final read-out. In this case, the portion of the recording belt 1 carrying the radiation image is first conveyed leftward through the image read-out section 20 for conducting preliminary read-out. Thereafter, the rollers are rotated in the opposite direction to return the image-recorded portion of the belt to the scanning start position and the belt is then again conveyed leftward for conducting final read-out. The recording belt is conveyed at a higher speed during preliminary read-out than during final read-out.

Following completion of the read-out operation, the portion of the recording belt from which image information has been read out is conveyed to an erasing section 30 by the first and second roller sections 40, 50. The erasing section 30 consists of a case 31 and a number of erasing light sources 32, e.g. eight fluorescent lamps, arranged side by side in the case 31. The erasing light sources 32 housed in the case 31 mainly emit light having a wavelength within the stimulation wavelength range for the stimulable phosphor layer of the recording belt. The radiation energy remaining in the stimulable phosphor layer after read-out is released by irradiating the entire image area of the recording belt with the light emitted by the erasing light sources 32 as the recording belt is conveyed through the erasing section 30. (The reference numeral 33 designates a filter for cutting the ultraviolet component of the erasing light.) A lead plate 2 is disposed beneath the recording table 14 so that portions of the recording belt 1 located at the image read-out section, the erasing section and elsewhere within the apparatus will be shielded from, and thus unaffected by, radiation emitted by the radiation source 11 during image recording. Since in the present apparatus read-out and erasing are conducted at positions laterally separated from each other by a prescribed distance, it is necessary to ensure that light will not leak from the erasing section 30 into the image read-out section 20 while read-out is being conducted. To this end, the nip rollers 61, 61 and nip rollers 62, 62 are provided at opposite ends of the erasing section 30 so as to nip the recording belt therebetween and prevent erasing light from the belt surface from entering the image read-out section 20. In addition, to ensure thorough light shielding, the nip roller pairs 61, 62 and the side of the recording belt opposite from that facing the erasing light sources 32 is covered with a shield plate 63. The apparatus further has a roller 64 disposed between the image read-out section 20 and the erasing section 30 in such a position that it causes the conveyance path of the recording belt 1 to be shifted upward. This roller 64 also helps to shield the image read-out section 20 from the intrusion of light.

Following completion of the erasing operation in the erasing section, the erased portion of the recording belt is again conveyed to the image recording section 10 where it can again be recorded with radiation image information.

While snaking of the recording belt 1 may occur during belt conveyance, in the apparatus according to the present invention such snaking ca be easily suppressed by means of the roller 42 which, as explained earlier, can be positionally shifted. The manner in which snaking of the recording belt is suppressed will now be explained in detail with respect to FIG. 1 and FIG. 4, the latter of which shows a perspective view of the roller 42 and surrounding portions.

Figure 4:
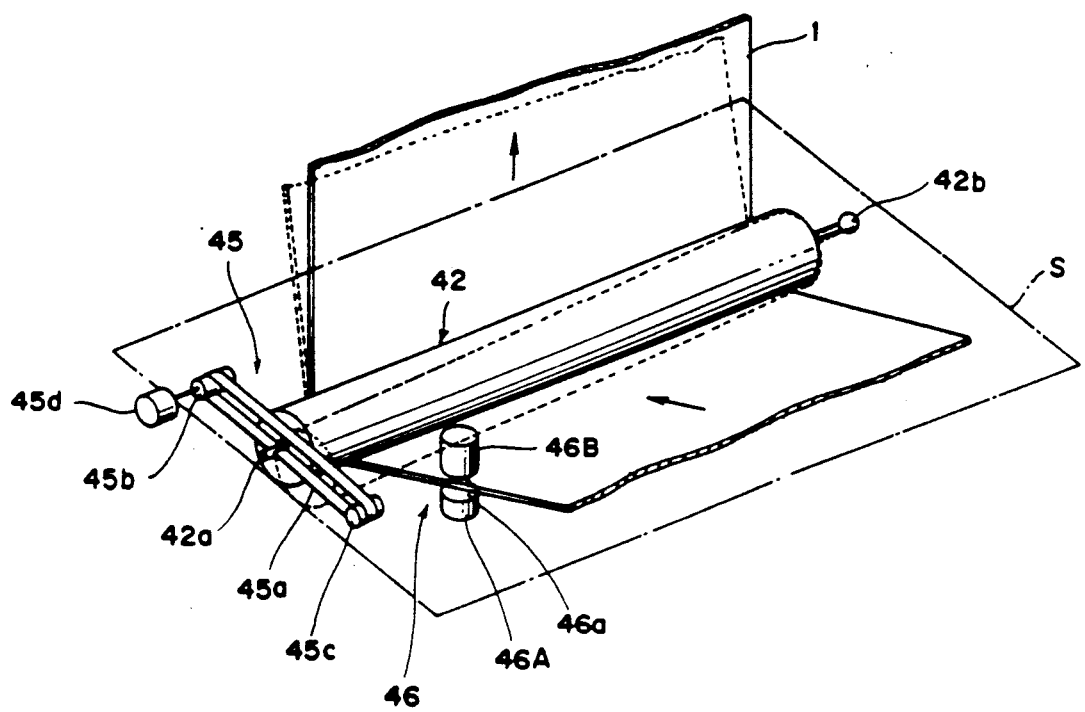
FIG. 4 is a perspective view showing a roller which is moved by a snaking suppression means, and the immediate vicinity thereof.

One end of the shaft 42a of the roller 42 is connected to a snaking suppression means 45 consisting of the belt 45a, the rollers 45b, 45c, and the motor 45d, while the other end 42b is fixed via a ball joint to a side plate 4 of the apparatus (see FIG. 2) so that the roller 42 can be swung about its end 42b. Swinging of the roller 42 is carried out in such manner that it causes substantially no change in the distance over which the recording belt 1 is conveyed during one revolution. More specifically, since the angle at which the recording belt 1 approaches the roller 42 and the angle at which it leaves the same differ by 90°, the roller 42 is, as shown in FIG. 4, moved within a plane S which makes an angle of 45° with respect to both of the aforesaid directions.

The suppression of recording belt snaking by swinging the roller 42 is carried out on the basis of the amount and direction of snaking detected by a snaking detection means 46 consisting of a light emitter 46A and a light receiver 46B. The light emitter 46A and the light receiver 46B are disposed to face each other with the recording belt 1 passing therebetween. The light emitter 46A emits light from its entire light emitting face 46a and the light receiver 46B receives the light emitted by the light emitter 46A and detects the quantity thereof. The position of the light emitter 46A is such that half of its light emitting face 46a is covered by the recording belt 1 when the recording belt 1 is traveling along its prescribed path. When the recording belt 1 begins to snake, this causes an increase or decrease in the area of the light emitting face 46a covered by the recording belt 1 and thus causes a decrease or increase in the quantity of light received by the light receiver 46B. The light receiver 46B outputs a detection signal indicative of the quantity of light received thereby and this detection signal is used to control the rotation of the motor 45d for shifting the position of the roller 42. For example, if the roller 42 is shifted t the position indicated by the broken line in FIG. 4 at the time that the light quantity detected by the light receiver 46B exceeds a prescribed value, the position of the recording belt 1 departing from the roller 42 will be shifted to the position indicated in broken lines. As a result, snaking of the recording belt will be suppressed. On the other hand, when the light quantity detected by the light receiver 46B falls below a prescribed quantity, the motor 45d is rotated in the reverse direction so as to swing the roller 42 in the reverse direction. While the operation for suppressing snaking of the recording belt can be carried out as often as desired, in the embodiment of the apparatus under discussion it is, by way of example, carried out once per revolution of the recording belt. Preferably, read-out should not be conducted in the image read-out section 20 during the period that the roller 42 is in the position for snaking suppression and snaking suppression is in progress. The endless recording belt 1 is ordinarily formed by fastening together the opposite ends of a flat recording belt and in this case image recording cannot be conducted at the portion corresponding to the seam between the two ends. In the present embodiment of the apparatus, therefore, it is convenient to conduct snaking suppression at the time that the seam is passing through the image read-out section 20. More specifically, as shown in FIG. 1, detection of the seam is carried out between the rollers 51, 52 of the second roller section 50 by a detection means 80 which directs a beam of light onto the recording belt 1 and detects the presence of the seam from a change in the state of the reflected light. After the seam has been detected by the detection means 80, the aforesaid rotary encoder 55 (see FIG. 2) detects the arrival of the seam at the image read-out section 20 from the amount of rotation of the motor 53 detected thereby. When the arrival of the seam has been detected in this way, the snaking detection means 46 sends a signal to the motor 45d of the snaking suppression means 45, causing the roller 42 to be appropriately shifted.

Figure 5:
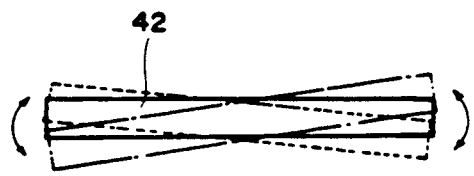
FIG. 5 is a schematic view showing another example of how the roller is moved.

It should be noted that the invention is not limited to the method of detecting the amount of snaking described above and any of various other methods can be used instead. That is, detection of the position of the recording belt need not necessarily be conducted by detecting a quantity of light but can be carried out instead, for example, by directly detecting the position of the edge of the recording using a reflection-type light sensor or the like. Moreover, the position at which the snaking detection means is disposed is not particularly limited either, and this means may be provided at any desired position which is appropriate for enabling the roller to be shifted on the basis of the detected value. Further, the roller 42 can alternatively be rotated within the plane S about the center of the roller 42 in its lengthwise direction, as shown in FIG. 5. It should also be noted that since the roller 42 must be moved in a manner which does not substantially change the distance over which the sheet is conveyed per revolution, the direction in which the roller 42 should be moved for suppressing snaking of the recording belt will vary depending on such factors as the directions in which the recording belt 1 approaches and leaves the roller 42. Moreover, the invention does not limit the number of rollers to be positionally shifted for snaking suppression to only one, and snaking suppression can, if convenient, be carried out by moving a plurality of rollers. Further, it is possible to connect the roller to be shifted with an energizing means such as a spring and to shift the position of the roller by the elongation/contraction of this energizing means. In this case, the shiftable roller can, during normal operation, double as a tension roller.

In a case where the amount of snaking is particularly large and adequate suppression either cannot be realized or, if realizable, requires an inordinate length of time, it is possible to provide in addition to the aforesaid snaking suppression means a means for eliminating snaking by gripping the edge of the recording belt and pulling it back to the prescribed position after the nipping action of the nip rollers and the tensioning action of the tension roller have been released.

In accordance with the apparatus according to the embodiment of the invention described in the foregoing, it becomes possible, in an apparatus wherein an endless recording belt is successively conveyed through an image recording section, an image read-out section and an erasing section, to detect the amount of snaking of the recording belt and then to shift the position of a roller on the basis of the so-detected value. Thus snaking of the recording belt can be easily suppressed by a mechanism of simple structure and the recording belt can be made to travel along the proper path at all times.

Moreover, a particularly noteworthy advantage of the apparatus according to the foregoing embodiment is the structural arrangement wherein the length of recording belt conveyance determined by the distance between the axes of the two roller sections 40, 50 is made equal to the length of the largest sized image to be recorded with the apparatus, the image recording section is disposed above the recording belt, and the image read-out section and the erasing section are disposed beneath the recording belt. With this structural arrangement, the overall length of the apparatus in the widthwise direction can be held close to that of the aforesaid largest sized image so that the recording and read-out apparatus can be made extremely compact. Further, the stimulating beam main-scans the recording belt at the position where it passes over one of the conveyor rollers, which is a position at which the travel of the recording belt is most stable, thus enabling high precision scanning to b realized.

It should be noted that the stimulable phosphor layer need not be provided over the entire surface of the recording belt and, specifically, that it is possible to form it only at one or two portions, each of the size of a single image. Further, optimum effect toward making the apparatus compact can be had if the distance between the outside edges of the two roller sections is made not more than 1.5 times the length of the largest sized image to be recorded with the apparatus. In this case, for facilitating support of the object whose radiation image is to be recorded, it is possible to provide the apparatus with a relatively large outer case or, as shown in FIG. 1, to provide the recording table 14 with an outwardly projecting extension 14′.

While one arrangement of the recording belt conveyor rollers has been illustrated in connection with the above-described embodiment, this is not limitative and any number of rollers desired can be disposed in the positions desired. For example, an idle roller can be provided on either side of the image recording section and the positions of these idle rollers can be made adjustable so as to enable adjustment of the length of the portion of the recording belt conveyed therebetween. With this arrangement, one portion of the recording belt can be stopped at the image recording section while the recording belt continues to be conveyed through the image read-out section, thus enabling image recording at the image recording section and read-out at the image read-out section to be conducted simultaneously. As a result, a large number of image recording operations can be carried out with good efficiency.

As has been explained in detail in the foregoing, in the radiation image recording and read-out apparatus according to the present invention the amount and direction of snaking of a recording belt are detected by a snaking detection means and one or more rollers among the roller group for conveying the recording belt is/are positionally shifted. Thus with a simple mechanism it becomes possible to suppress snaking of the recording belt and ensure proper travel of the recording belt at all times.

I claim:

1. An image recording and read-out apparatus comprising:
- an endless recording belt having a stimulable phosphor layer,
- a group of conveyor rollers for supporting and circulating said recording belt,
- an image recording section for recording a radiation image of an object on said stimulable phosphor layer by exposing said stimulable phosphor layer to a radiation passing through said object,
- an image read-out section consisting of a stimulating ray source for emitting stimulating rays for scanning said stimulable phosphor layer carrying said radiation image stored thereon, and a photoelectric read-out means for detecting light emitted from said stimulable phosphor layer scanned with said stimulating rays to obtain an electric image signal,
- an erasing section for, prior to the next image recording on said stimulable phosphor layer for which the image read-out has been conducted in said image read-out section, exposing said stimulable phosphor layer to erasing light to release the radiation energy remaining on said stimulable phosphor layer,
- a snaking detection means for detecting the amount and direction of snaking of said recording belt, and
- a snake suppression means for suppressing snaking of said recording belt which, in response to the output of said snaking detection means, swings the axis of rotation of a prescribed one of said group of conveyor rollers in a direction which produces substantially no change in the length of the conveyance path of said recording belt, wherein said prescribed one of said group of conveyor rollers is swung about one end of a shaft thereof, and wherein said prescribed one of said group of conveyor rollers i moved within a plane having an angle of 45 degrees with respect to an angle at which said recording belt approaches said prescribed one of said group of conveyor rollers and an angle at which said recording belt leaves said prescribed one of said group of conveyor rollers.

2. A radiation image recording and read-out apparatus as defined in claim 1 wherein said group of conveyor rollers comprises two roller sections separated from each other by a distance equal to not more than 1.5 times the length of the largest sized radiation image which can be recorded in said image recording section and said recording belt is conveyed to pass between said roller sections separated by said distance.

3. A radiation image recording and read-out apparatus as defined in claim 1 wherein said snaking detection means comprises a light emitter and a light receiver disposed in facing relation on opposite sides of said recording belt with one half of a light emitting face of said light emitting member being covered by said recording belt when said recording belt is traveling normally and said light receiver detects the direction and amount of snaking of said recording belt from changes in the quantity of light it receives from said light emitter.

4. An image recording and read-out apparatus comprising:
- an endless recording belt having a stimulable phosphor layer,
- a group of conveyor rollers for supporting and circulating said recording belt,
- an image recording section for recording a radiation image of an object on said stimulable phosphor layer by exposing said stimulable phosphor layer to a radiation passing through said object,
- an image read-out section consisting of a stimulating ray source for emitting stimulating rays for scanning said stimulable phosphor layer carrying said radiation image stored thereon, and a photoelectric read-out means for detecting light emitted from said stimulable phosphor layer scanned with said stimulating rays to obtain an electric image signal,
- an erasing section for, prior to the next image recording on said stimulable phosphor layer for which the image read-out has been conducted in said image read-out section, exposing said stimulable phosphor layer to erasing light to release the radiation energy remaining on said stimulable phosphor layer,
- a snaking detection means for detecting the amount and direction of snaking of said recording belt, and
- a snaking suppression means, connected to a first end of a shaft of a prescribed one of said group of conveyor rollers, for suppressing snaking of said recording belt which, in response to the output of said snaking detection means, swings the axis of rotation of said prescribed one of said group of conveyor rollers in a direction which produces substantially no change in the length of the conveyance path of said recording belt, said snaking suppression means comprising a belt, a plurality of rollers, and a motor, and wherein said prescribed one of said group of conveyor rollers is swung about said first end of a shaft thereof, and wherein a second end of said shaft of said prescribed one of said group of conveyor rollers is fixed to said apparatus so that said prescribed one of said group of conveyor rollers can be swung about said first end thereof.

* * * * *